United States Patent
Kido

(10) Patent No.: US 7,322,424 B2
(45) Date of Patent: Jan. 29, 2008

(54) CROP SEPARATING HARVESTER

(75) Inventor: Duane Robert Kido, P.O. Box 552, 28850 Parma Rd., Parma, ID (US) 83660

(73) Assignee: Duane Robert Kido, Parma, ID (US)

( * ) Notice: Subject to any disclaimer, the term of this patent is extended or adjusted under 35 U.S.C. 154(b) by 0 days.

(21) Appl. No.: 11/188,350

(22) Filed: Jul. 25, 2005

(65) Prior Publication Data

US 2007/0032279 A1 Feb. 8, 2007

(51) Int. Cl.
- A01D 31/00 (2006.01)
- A01D 17/10 (2006.01)
- A01D 33/08 (2006.01)
- A01D 27/00 (2006.01)

(52) U.S. Cl. .............. 171/17; 171/20; 209/321

(58) Field of Classification Search ........... 460/99, 460/90, 100; 56/16.6; 171/17, 41, 31, 26, 171/58, 138, 20; 209/318, 321
See application file for complete search history.

(56) References Cited

U.S. PATENT DOCUMENTS

| | | | | |
|---|---|---|---|---|
| 2,849,118 A | * | 8/1958 | Ashton | 209/318 |
| 3,603,063 A | * | 9/1971 | Stroburg et al. | 56/14.6 |
| 3,664,349 A | * | 5/1972 | Quick | 460/99 |
| 3,800,804 A | * | 4/1974 | Boone | 460/99 |
| 3,833,006 A | * | 9/1974 | Temple | 460/99 |
| 3,920,542 A | * | 11/1975 | Laird et al. | 209/134 |
| 4,035,996 A | * | 7/1977 | Fernandez et al. | 56/13.9 |
| 4,242,952 A | * | 1/1981 | van der Schoot | 99/625 |
| 4,287,707 A | * | 9/1981 | Persoons et al. | 56/12.8 |
| 4,753,296 A | * | 6/1988 | Kruithoff | 171/26 |
| 5,024,278 A | * | 6/1991 | Shuknecht | 171/17 |
| 5,197,549 A | | 3/1993 | Shuff | |
| 5,197,550 A | | 3/1993 | Barnard | |
| 5,376,046 A | * | 12/1994 | Shuknecht et al. | 460/99 |
| 5,431,000 A | * | 7/1995 | Shuknecht | 56/308 |
| 5,624,315 A | * | 4/1997 | Jonckheere | 460/99 |
| RE35,917 E | * | 10/1998 | Fischer et al. | 56/12.9 |
| 6,484,810 B1 | * | 11/2002 | Bendix et al. | 171/31 |
| 2002/0086722 A1 | * | 7/2002 | Kuhn et al. | 460/100 |

FOREIGN PATENT DOCUMENTS

FR 2589371 A1 * 5/1987

* cited by examiner

Primary Examiner—Árpád Fábián Kovács
(74) Attorney, Agent, or Firm—Bryan G. Pratt; Rader, Fishman & Grauer PLLC

(57) ABSTRACT

A crop separating harvester includes a primary crop path having an apex, a forced air supply tangentially positioned to the crop path from a bottom side of the apex, and a crop retrieval member, wherein said crop retrieval member is separated from said apex a predetermined distance defining a gap configured to separate culls from a crop based on a difference in specific gravity between said crop and said culls with respect to said forced air.

10 Claims, 8 Drawing Sheets

CROP SEPARATING HARVESTER

BACKGROUND

As is well known, the harvesting of bulb crops such as onions, beets, radishes, turnips, garlic and the like (collectively referred to herein as "crops") present particular difficulties that make harvesting such crops more difficult and expensive than many other types of crops. Typically, the useful bulb portion of these crops grow in the soil with roots growing down from the useful portion and top plant material growing upward above the soil. To harvest the crops, the entire plant must first be extracted from the ground and then the roots and tops must be cut off. Harvesting these crops by hand is a very expensive, labor intensive process requiring a significant number of laborers to extract the crops and then separate the bulb from the roots and tops. As a result, mechanical harvesters for harvesting these crops have been in use for a number of years.

However, mechanical harvesters have also suffered from a number of difficulties. Specifically, many mechanical harvesters have problems with nicking, cutting, and/or bruising of the crop bulb. In order to efficiently harvest the bulb crops without inducing severe bruising, nicking, and/or cutting of the bulb by the machinery, the crop is harvested when the surrounding soil contains sufficient moisture to adhere slightly to the crop when lifted. While aiding in the initial harvest of the bulb crop, the inclusion of an appropriate amount of moisture is also conducive to the production of dirt clods and other cull items that are difficult to mechanically distinguish from the desired crop.

SUMMARY

A crop separating harvester includes a primary crop path having an apex, a forced air supply tangentially positioned to the crop path from a bottom side of the apex, and a crop retrieval member, wherein said crop retrieval member is separated from said apex a predetermined distance defining a gap configured to separate culls from a crop based on a difference in specific gravity between said crop and said culls with respect to said forced air.

A method for separating a desired crop from culls includes presenting a combination of crop and cull, introducing a stream of forced air substantially tangential to said combination of crop and cull, and separating said combination of crop and cull based on an amount of lift provided by said stream of forced air.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary crop separation harvester is disclosed herein that separates a desired crop from its cull based on a difference in specific gravity between the crop and the cull. More specifically, the present exemplary crop separation harvester introduces high velocity forced air to a flow of crop and cull. Due to the difference in specific gravity between the crop and the cull, the forced air translates each a varying distance. Consequently, the crop and the cull may be mechanically separated. Specific details of the crop separation harvester, as well as the operation thereof will be provided in detail below.

Unless otherwise indicated, all numbers expressing quantities and measurements used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Similarly, no relational conclusions shall be drawn with respect to the elements of the figures as the figures may not be drawn to scale.

As used herein, and in the appended claims, the term "specific gravity" shall be interpreted broadly as meaning a ratio of the mass of a material to the mass of an equal volume of water at 4° C. (39° F.). Because specific gravity is a ratio, it is a unitless quantity. For example, the specific gravity of water at 4° C. is 1.0 while its density is 1.0 g/cm$^3$.

Additionally, the term "culls" shall be interpreted as including any object harvested with a crop that is rejected or otherwise set aside as unsatisfactory. In the context of bulb crops, the culls may include, but are in no way limited to, rocks, wood, dirt clods, weeds, and the like.

In the following description, for purposes of explanation, numerous specific details are set forth in order to provide a thorough understanding of the present system and method for making and operating a crop separating harvester. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
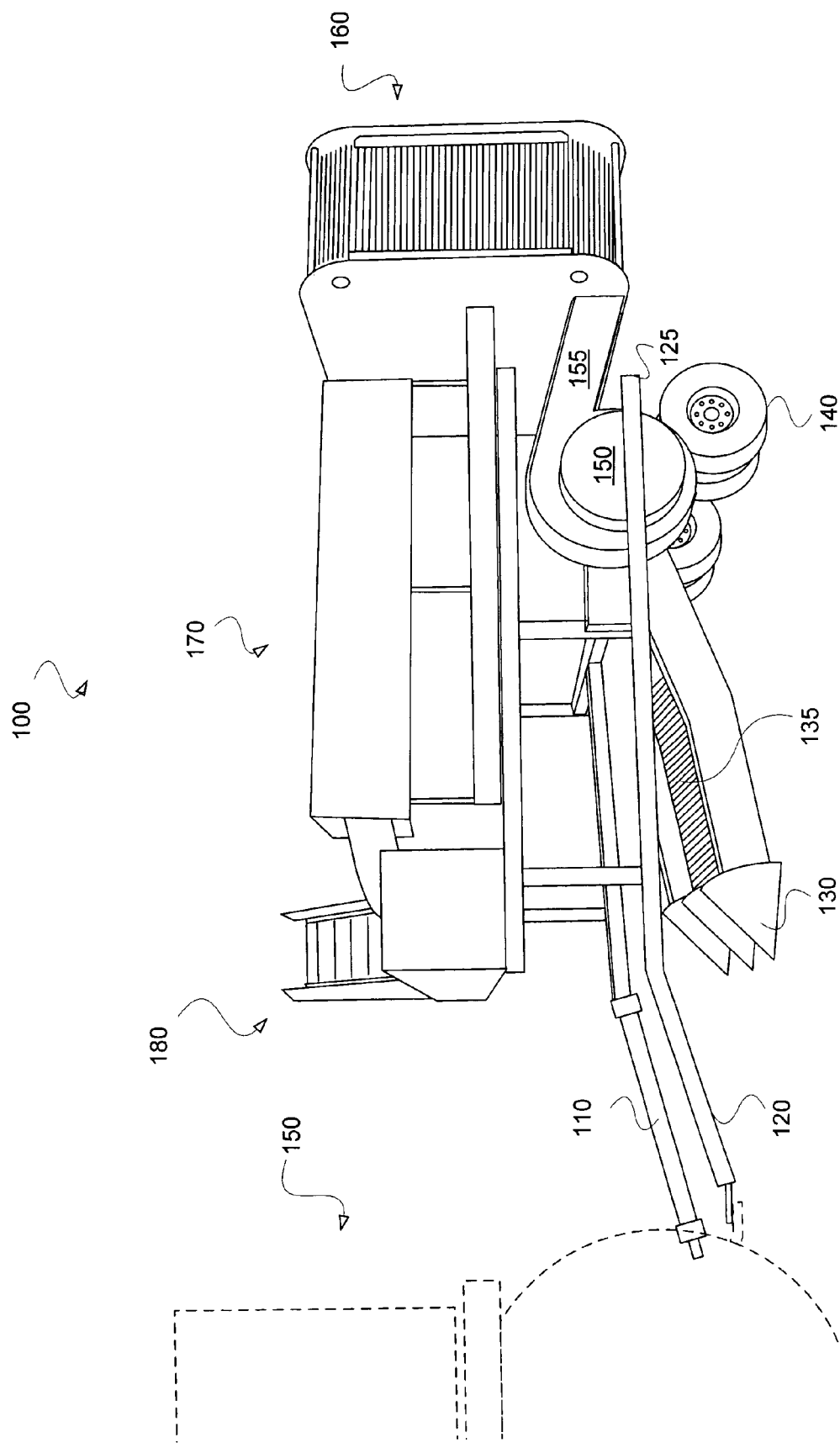
FIG. 1 illustrates a perspective side view of a crop separating harvester, according to one exemplary embodiment.

FIG. 1. illustrates a side perspective view of an assembled crop separating harvester coupled to a tractor, according to one exemplary embodiment. As illustrated in FIG. 1, the present exemplary crop separating harvester (100) may be coupled to a tractor (150). While the present crop separating harvester (100) is described herein as a tractor implement that is pulled behind and obtains its operational power from a tractor (150), such an embodiment is described for ease of explanation only. Rather, the present crop separating harvester may be implemented as a self-propelled mechanism, or alternatively as will be described below with reference to FIG. 12, the present exemplary crop separating harvester may be implemented as a non-mobile unit for use at a crop packing or transloading station.

Continuing with the exemplary embodiment illustrated in FIG. 1, the crop separating harvester (100) includes a power take off (PTO) shaft (110) and a tongue (120) coupled to the tractor (150). According to this exemplary embodiment, the crop separating harvester (100) receives operational power in the form of rotational power from the PTO shaft (110). Additionally, the tongue (120) is mechanically coupled to the tractor (150) to allow the tractor to tow the crop separating harvester (100) during harvest in a field. Additionally, the tongue (120) is structurally coupled to a frame or support structure (140) and a plurality of wheels (140) to aid in the selective translation of the harvester (100).

As illustrated, a crop path is established in the crop separating harvester (100) by a number of crop transport and manipulation components. More specifically, according to the exemplary embodiment illustrated in FIG. 1, the crop separating harvester (100) includes a lifting assembly (130) and a primary chain (135) configured to dig and transport the desired crop onto the crop separating harvester (100), as is well known in the art. As illustrated, the lifting assembly (130) is configured to be hydraulically adjusted such that it will be introduced below the surface of a crop to lift the crop and its surrounding dirt onto the primary chain (135). Once on the primary chain, small dirt particles and other debris or cull may pass freely between the links of the primary chain (135) and back onto the ground.

Continuing along the crop separating harvester (100), the primary chain (100) leads to a forced air unit (150) or fan and its associated duct work (155) configured to selectively introduce forced air into the present system. According to one exemplary embodiment, the forced air unit (150) includes a rotary fan, including a number of impellers, which is rotationally coupled to the PTO shaft (110). According to this exemplary embodiment, rotational velocity may be transferred from the PTO shaft (110) to the forced air unit (150) to generate large amounts of forced air, as is known in the art.

Additionally, a rear vertical elevator (160) is disposed at the rear of the crop separating harvester (100) leading to a top mounted inspection table (170). As illustrated, the inspection table (170) then leads to a crop transfer boom (180) configured to load a desired crop onto a truck or crates.

Further detail of the exemplary structure of the crop separating harvester (100) will be given below with reference to FIGS. 2 through 6.

Figure 2:
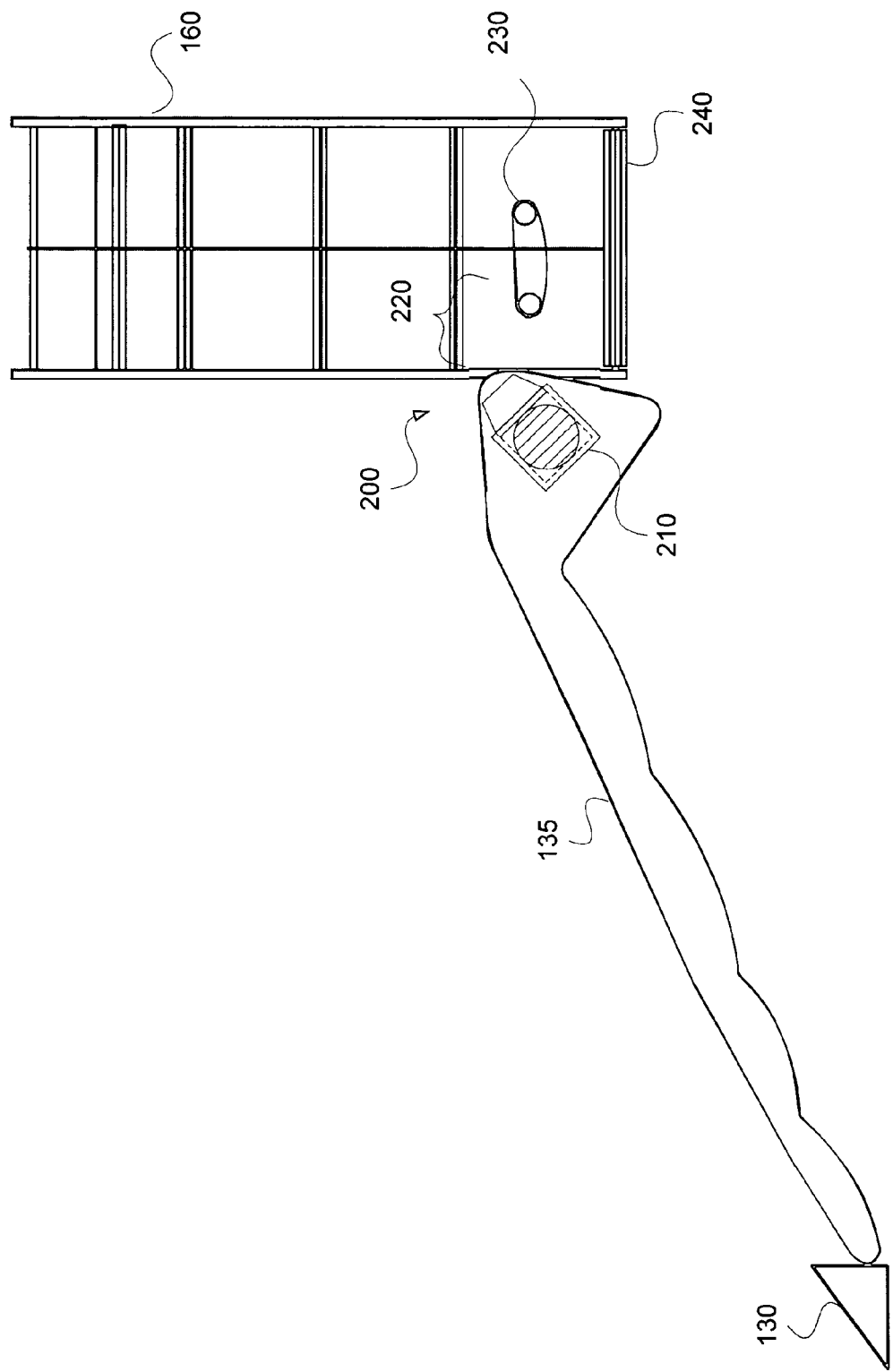
FIG. 2 illustrates a side view of a main elevator and a crop separation apparatus, according to one exemplary embodiment.

FIG. 2 illustrates a cross-sectional view of the initial components of the crop separating harvester (100) according to one exemplary embodiment. As shown, the lifting assembly (130) is coupled to the primary chain (135), as is well known in the art. However, the primary chain then leads to an exemplary crop separation unit (200). As illustrated in FIG. 2, the crop separation unit (200) includes a forced air box (210) positioned behind the primary chain (135) at an approximate apex of a bend in the primary chain. Additionally, the exemplary crop separation unit (200) includes a transfer conveyor (230) separated from the primary chain (135) by a crop separation gap (220). Located below the crop separation gap (220) and the transfer conveyor (230) is a split horizontal conveyor portion (240) of the rear vertical elevator (160). According to one exemplary method, described in further detail below, the forced air box (210) disposed in the crop separation unit (200) is configured to provide sufficient forced air to translate a desired crop across the separation gap (220) to the transfer conveyor (230), while allowing the culls to drop through the separation gap (220), due to their difference in specific gravity. By causing the culls to drop through the separation gap (220), they are subsequently loaded onto a first portion of the split horizontal conveyor (240) of the rear vertical elevator (160). Additionally, the crop that is force to the transfer conveyor (230) is subsequently translated to a second portion of the split horizontal conveyor (240).

Figure 3:
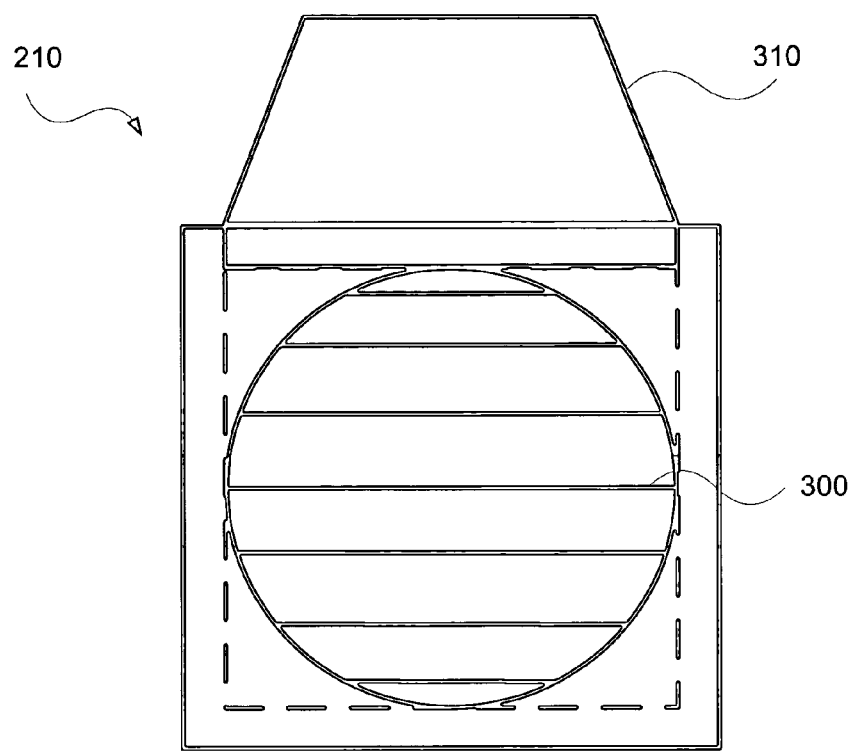
FIG. 3 is a cut-away side view of a forced air box, according to one exemplary embodiment.

FIG. 3 illustrates the components of the forced air box (210), according to one exemplary embodiment. As illustrated in FIG. 3, the forced air box (210) includes an inlet that leads to a number of outlet vanes (300) positionally configured to channel and evenly distribute forced air around a corner and through the channeling member (310) in a desired orientation. According to the present exemplary embodiment, the forced air box (210) is configured to be securely coupled to the duct work (155; FIG. 1) of the forced air unit (150; FIG. 1) such that forced air may be provided thereto.

Figure 4:
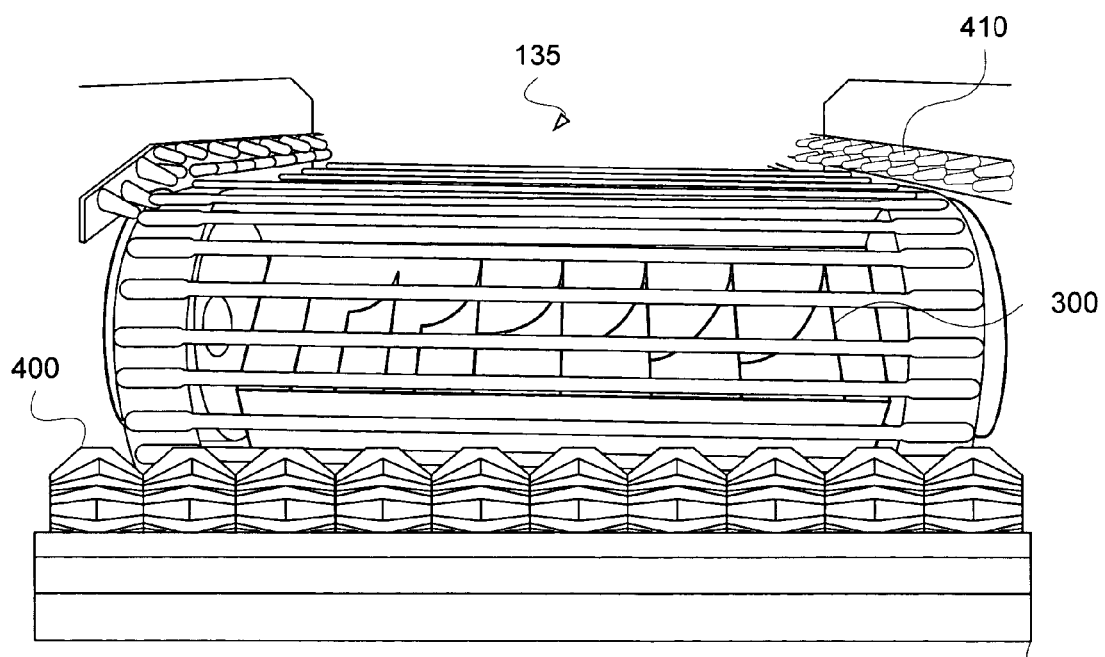
FIG. 4 illustrates front view of the apex of the main elevator as introduced to the forced air box, according to one exemplary embodiment.

As illustrated in FIG. 4, the outlet vanes (300) of the forced air box (200) are disposed behind the primary chain (135) such that the outlet vanes may introduce forced air from behind the apex of the primary chain (135), at a predetermined angle. As illustrated, the angle of forced air introduction may be approximately 45 degrees relative to the horizontal plane of the field. Alternatively, the forced air induction may assume any number of orientations relative to the primary chain (135) to impart a force on the desired crop, thereby differentiating the crop from the cull. Continuing with FIG. 4, a number of bruise guards (410) are coupled to the side of the primary chain (135) such that they may protect the desired crop from cuts and bruises imparted due to contact with the sides of the harvester (100). Additionally, FIG. 4 illustrates a retention roller (400) including a plurality of individual nodular rollers disposed adjacent to the transfer conveyor (230), opposite the primary chain (135). According to one exemplary embodiment described more fully below, the retention roller (400) may have an angular rotation opposite that of the transfer conveyor (230) to aid in the retention of crops on the transfer conveyor (230).

Figure 5:
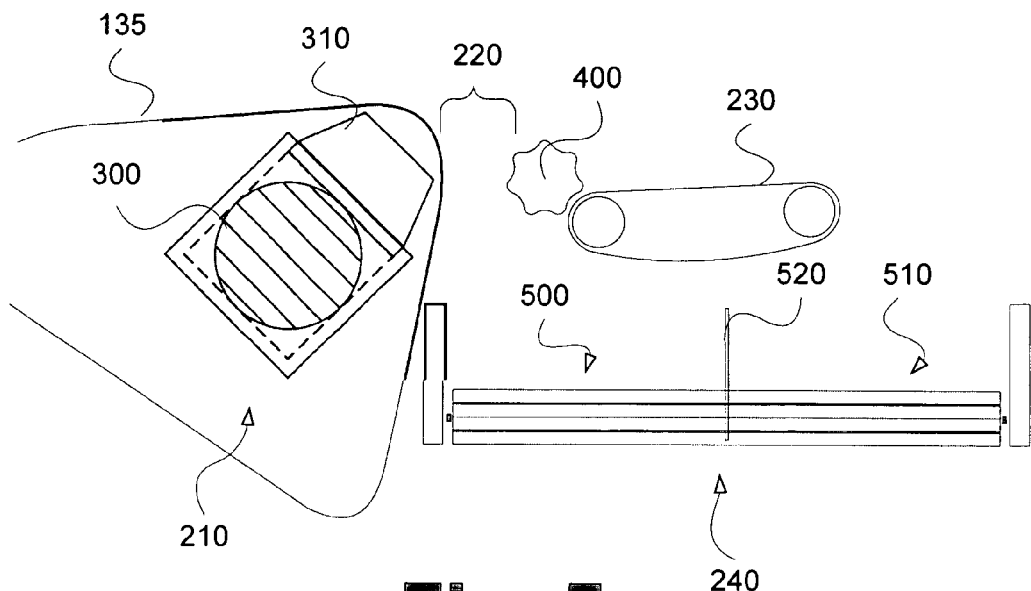
FIG. 5 is a side view illustrating a crop separation apparatus, according to one exemplary embodiment.

FIG. 5 illustrates a positional relationship between the forced air box (210) and the primary chain (135), the transfer conveyor (230), and the split horizontal conveyor portion (240) of the rear vertical elevator (160; FIG. 1). As shown in FIG. 5, the air box (210) is positioned behind the apex of the primary chain (135) such that the channeling member (310) of the forced air box (210) introduces air at approximately 45 degrees with respect to the apex of the primary chain (135). Additionally, as illustrated in FIG. 5, the apex of the primary chain (135) is disposed slightly above the transfer conveyor (230) in the vertical direction. As shown, the retention roller (400) is also disposed slightly above the transfer conveyor (230) in the vertical direction. During operation, the retention roller (400) may be configured to prevent a desired crop from falling of the portion of the transfer conveyor (230) nearest the primary chain (135). Both the retention roller (400) and the transfer conveyor (230) are positionally separated from the primary chain (135), such that a separation gap (220) is formed. Located below the transfer conveyor (230) in the vertical direction is the split horizontal conveyor portion (240) of the rear vertical elevator. As shown in FIG. 5, the horizontal conveyor portion (240) of the rear vertical elevator includes a first (500) and a second compartment (510), separated by a separation member (520). According to one exemplary embodiment, the first compartment (500) may be utilized as a cull compartment, and the second compartment (510) may be utilized as a crop compartment, depending on the difference in specific gravity between the desired crop and its culls.

Figure 6:
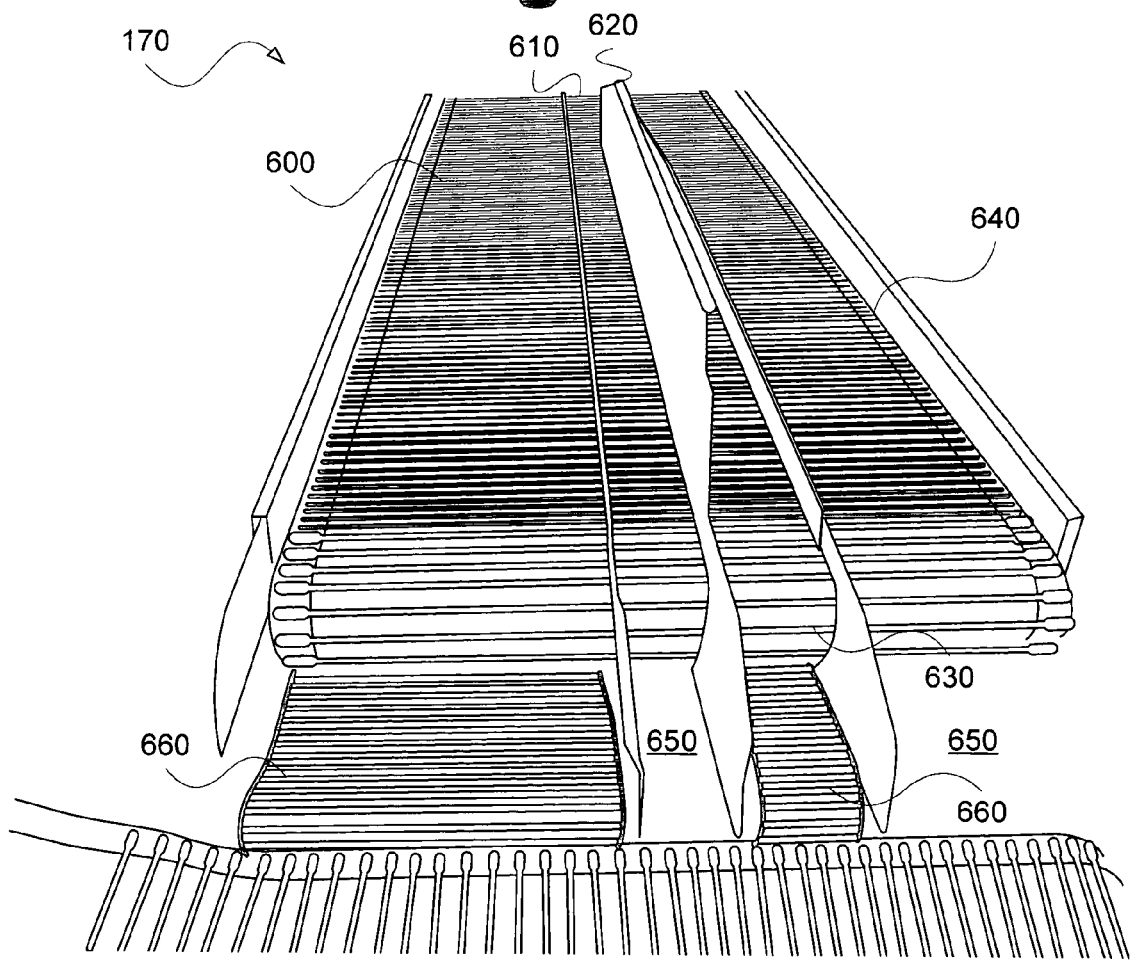
FIG. 6 is a top perspective view of a crop separating picking table, according to one exemplary embodiment.

The split horizontal conveyor portion (240) of the rear vertical elevator (160) is configured to transport materials contained in the first and second compartments (500, 510) to the top inspection table (170; FIG. 1). FIG. 6 is a top view illustrating the components of the top inspection table (170), according to one exemplary embodiment. As illustrated in FIG. 6, the inspection table (170) includes a first crop channel (600) and a cull separator section (610). Additionally, the inspection table includes a cull channel (640) and a crop separator (630). A separator member (620) separates the cull separator (610) and the crop separator (630), according to one exemplary embodiment. As is well known in the art, the crop channel (600), the cull separator (610), the crop separator (630), and the cull channel (640) are formed with a rotational belt system forming the lower surface of the table. According to one exemplary embodiment, the rotational belt system may be made of a number of interconnecting links, a solid belt system, and the like. According to one exemplary embodiment, any number of intermediate belts or other product transportation members may interconnect the inspection table (170) to the rear vertical elevator (160; FIG. 1).

Continuing with FIG. 6, the crop channel (600) and the crop separator (630) lead to a number of crop bridge belts (660) that may couple the crop channel (600) and the crop separator channel (630) to a crop transfer boom (180) configured to transport crops off the crop separating harvester (100) and onto a truck, crates, or another desired transport container. FIG. 6 also illustrates a plurality of cull disposal gaps (650) located at the end of the cull separator (610) and the cull channel (640). According to one exemplary embodiment, the cull disposal gaps (650) are configured to aid in the disposal of culls. An exemplary method for implementing the present crop separating harvester (100; FIG. 1) will be described below.

Exemplary Operation

Figure 7:
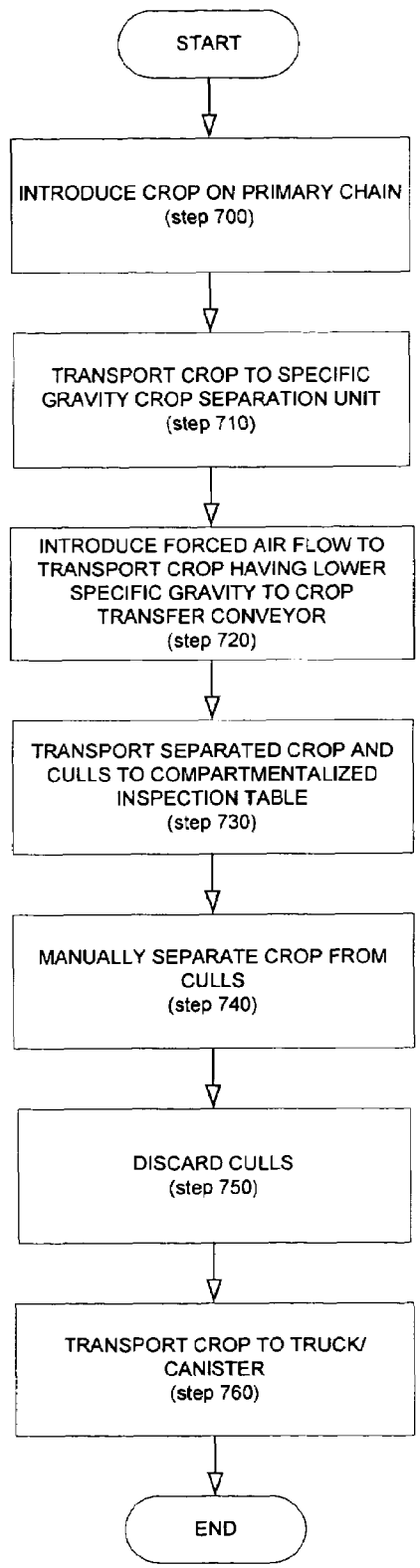
FIG. 7 is a flow chart illustrating the separation of a crop from its culls, according to one exemplary embodiment.

FIG. 7 illustrates an exemplary method for operating the present exemplary crop separating harvester (100; FIG. 1), according to one exemplary embodiment. As illustrated in FIG. 7, the present exemplary method begins by first introducing the desired crop onto the primary chain (step 700).

The crop may then be transported to a specific gravity crop separation unit (step 710) for selective crop separation. In order to separate the crop from culls, a force air flow may be introduced to the flow of crops to selectively transport crop having a lower specific gravity to the crop transfer conveyor (step 720), where the crop may be separated from the culls and deposited into separate compartments of the split horizontal conveyor portion of the rear vertical elevator. The separated crop and culls may then be transported to the crop channel and the cull channel of the compartmentalized inspection table respectively (step 730). The crop may then be manually separated from the culls (step 740), the culls discarded (step 750), and the desired crop transported to a truck or canister (step 760). Further details of the present exemplary method, as well as operation of the crop separation harvester (100; FIG. 1) will now be described with reference to FIGS. 8 through 11.

Figure 8:
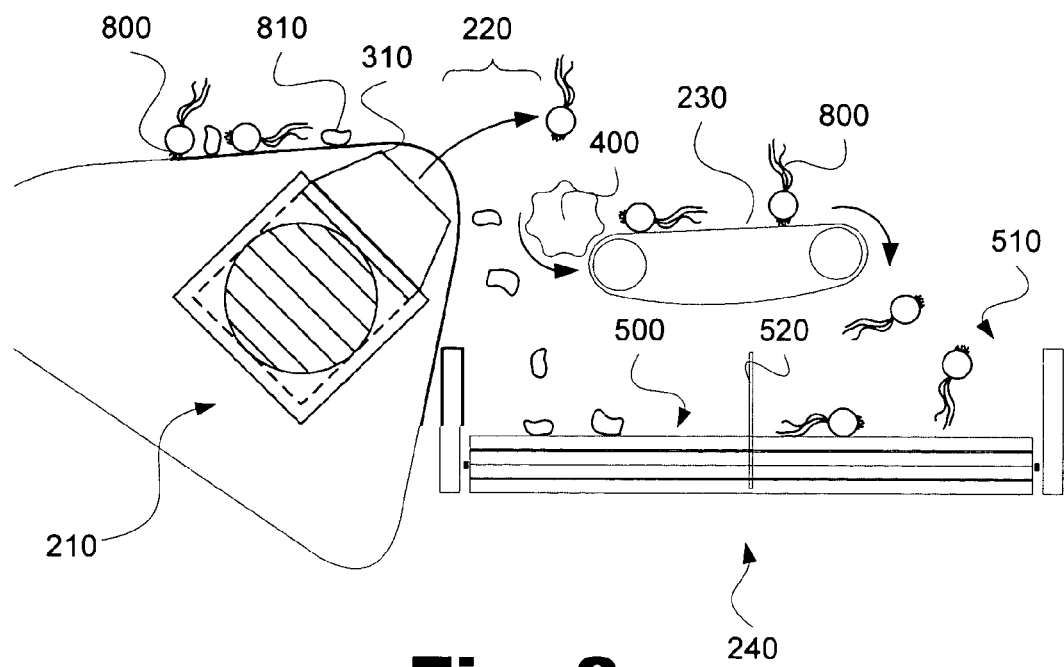
FIG. 8 is a side view illustrating the operation of a crop separation apparatus, according to one exemplary embodiment.

While the present exemplary crop separation harvester (100) may be used with any number of desired crops, for ease of explanation only, the operation of the present separation harvester will be described in the context of separating garlic from its cull. As mentioned in FIG. 7, the desired crop, such as garlic, is first introduced onto the primary chain (step 700). According to one exemplary embodiment, the lifting assembly (130; FIG. 1) is dug into the ground below the desired garlic, causing the garlic and its surrounding dirt to be lifted onto the primary chain. As illustrated in FIG. 8, the garlic (800) and cull (810) may then be translated to a specific gravity crop separating unit (step 710; FIG. 7).

When the garlic (800) and its surrounding cull (810) reaches the apex of the primary chain, forced air is introduced at the apex by a forced air box (210) forcing air through the channeling member (310) to transport garlic having lower specific gravity to the crop transfer conveyor (step 720). As illustrated in FIG. 8, the forced air imparts sufficient lift on the transported garlic (800) to cause the garlic to go over the separation gap (220), onto the transfer conveyor (230). Once on the transfer conveyor (230), the garlic (800) is prevented from falling back by the rotation of the retention roller (400). As a result, the transfer conveyor (230) transfers the garlic (800) to the second compartment (510), or the crop compartment, of the split horizontal conveyor portion (240) of the rear vertical elevator. According to one exemplary embodiment, the angle of the air box, as well as the velocities of the various belts may be controllably varied to optimize the present exemplary method.

As shown in FIG. 8, the cull (810) generally has a higher specific gravity than the garlic (800) or other crop. Consequently, the forced air introduced by the forced air box (210) does not impart sufficient lift on a majority of the cull to lift it over the separation gap (220). Rather, the cull drops between the separation gap (220) and onto the first (500) cull compartment of the split horizontal conveyor portion (240) of the rear vertical elevator.

Figure 9:
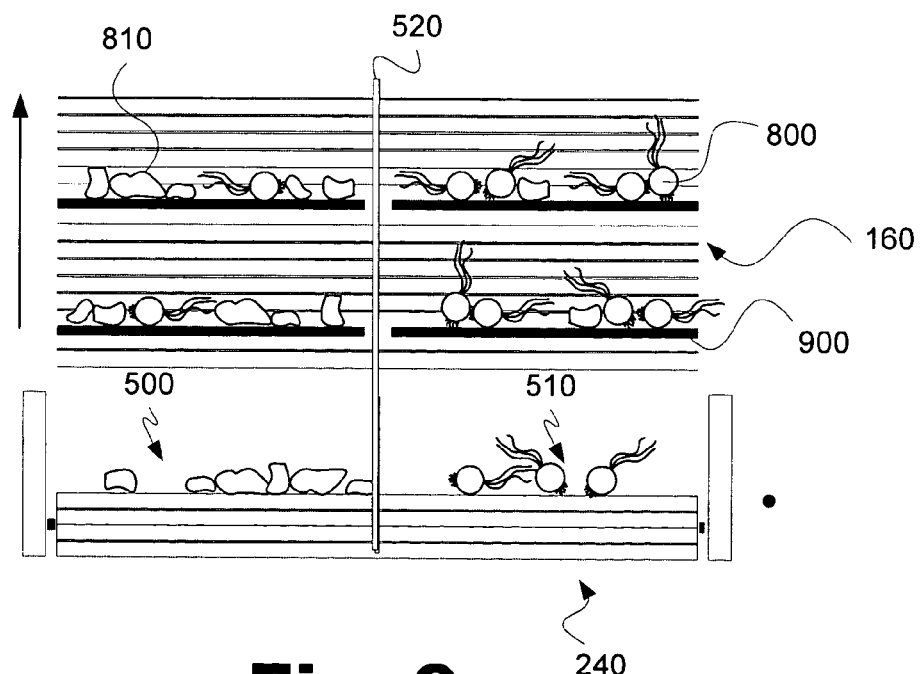
FIG. 9 is a side view illustrating a rear elevator with a plurality of compartments, according to one exemplary embodiment.

Once the garlic (800) or other crop and the cull (810) has been generally separated, they are transported by the rear vertical elevator (160; FIG. 1) onto the compartmentalized separation table (step 730; FIG. 7). FIG. 9 illustrates the transport of the garlic (800) and the cull (810) to the compartmentalized separation table (170; FIG. 1), according to one exemplary embodiment. As illustrated in FIG. 9, the rear vertical elevator (160) includes a number of elevator paddles (900) configured to support both garlic (800) and crop (810) as they are vertically transported. As illustrated in FIG. 9, occasionally a garlic bulb (800) has sufficient specific gravity that it passes through the separation gap (220) with the cull (810) and is transported in the first cull compartment (500; FIG. 8). Similarly, some culls (810) have sufficiently low specific gravity that the forced air provides sufficient lift for the culls (810) to pass over the separation gap (220) and into the second crop compartment (510; FIG. 8).

Figure 10:
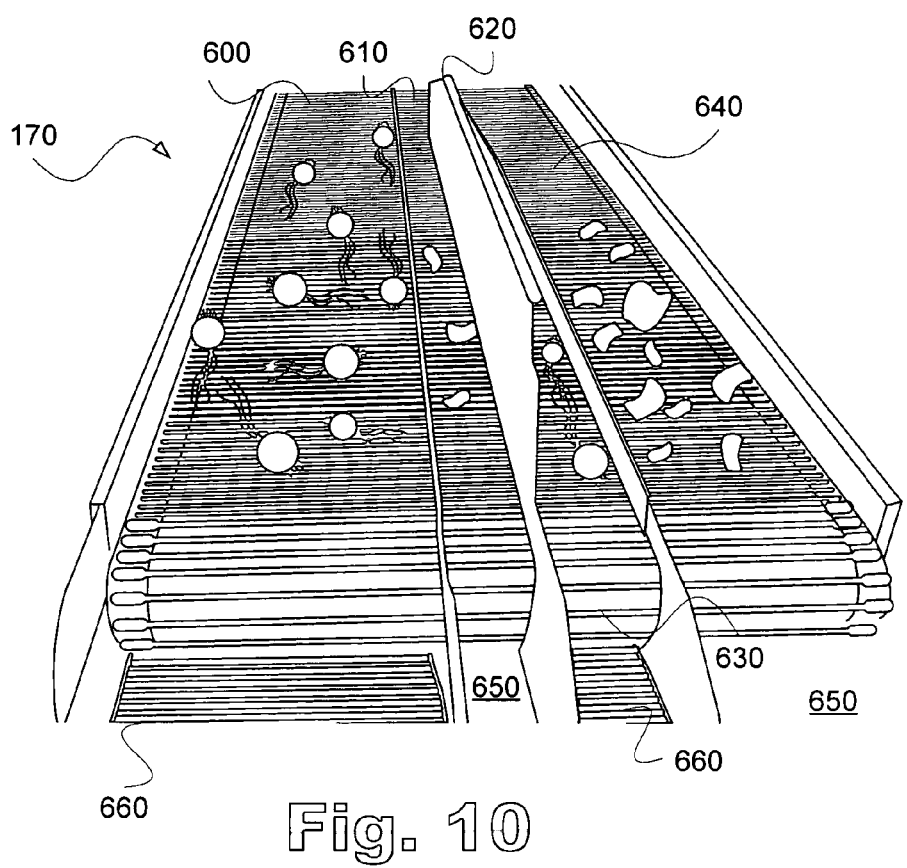
FIG. 10 is a top perspective view illustrating the operation of a multi-channel crop picking table, according to one exemplary embodiment.

FIG. 10 illustrates the disposal of the garlic (800) and the cull (810) onto the compartmentalized separation table (170). As illustrated, the garlic (800) from the second (510; FIG. 5) or crop compartment is transferred onto the crop channel (600) of the compartmentalized separation table. Similarly, the cull (810) and other material from the first (500; FIG. 5) or cull compartment are transferred onto the cull channel (640) of the compartmentalized separation table (170). As mentioned, some cull (810) may be present with the garlic (800) in the crop channel (600), and some garlic (800) may be present in the cull channel (640). Consequently, the compartmentalized separation table allows for the manual separation of the garlic (800) or other crop from the cull (step 740). According to the exemplary embodiment illustrated in FIG. 10, the relatively few culls (810) located in the crop channel (600) may be manually identified and removed to the cull separator (610). Similarly, the relatively few cloves of garlic (810) located on the cull channel (640) may be manually identified and placed in the crop separator (630). According to one exemplary embodiment, the preliminary separation of the culls (810) and the garlic (800) or other crop according to specific gravity using forced air reduces crop separation time and cost by requiring fewer observers to manually separate the garlic from the culls on the separation table (170).

Figure 11:
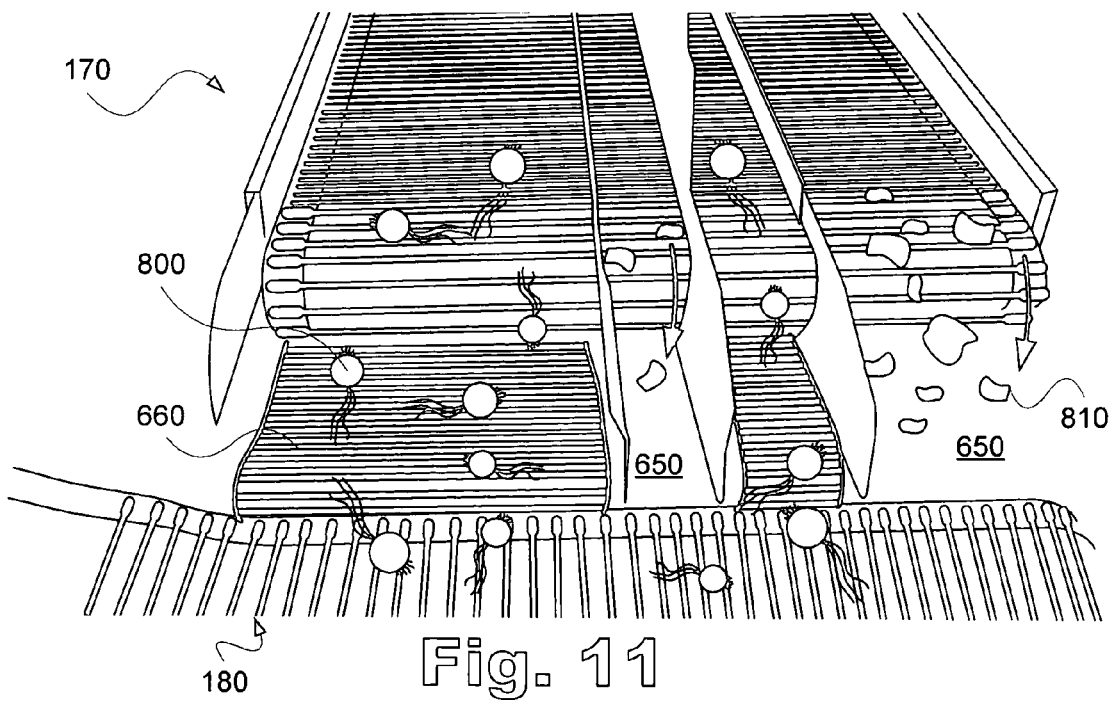
FIG. 11 is a top perspective view illustrating the removal of culls from a crop using a multi-channel crop picking table, according to one exemplary embodiment.

Once the garlic (800) and the culls (810) have been fully identified and separated, the culls are discarded (step 750; FIG. 7). As illustrated in FIG. 11, both the cull separator (610) and the cull channel (640) portions of the compartmentalized separation table (170) are led to cull gaps (650) where the cull (810) is disposed of by transfer to the field.

In contrast to the cull disposal, the garlic (800) or other crop is transferred to a truck, a crate, or another canister for transport and processing (step 760; FIG. 7). As illustrated in FIG. 11, the garlic (800) or other crop is fed from the crop channel (600) and the crop separator (630) onto a number of crop bridge belts (660). According to this exemplary embodiment, the crop bridge belts (660) allow the garlic (800) to traverse the cull gaps (650) and be dispensed onto the transfer boom (180) where the garlic may be transferred to a truck, crate, or other canister.

ALTERNATIVE EMBODIMENTS

Figure 12:
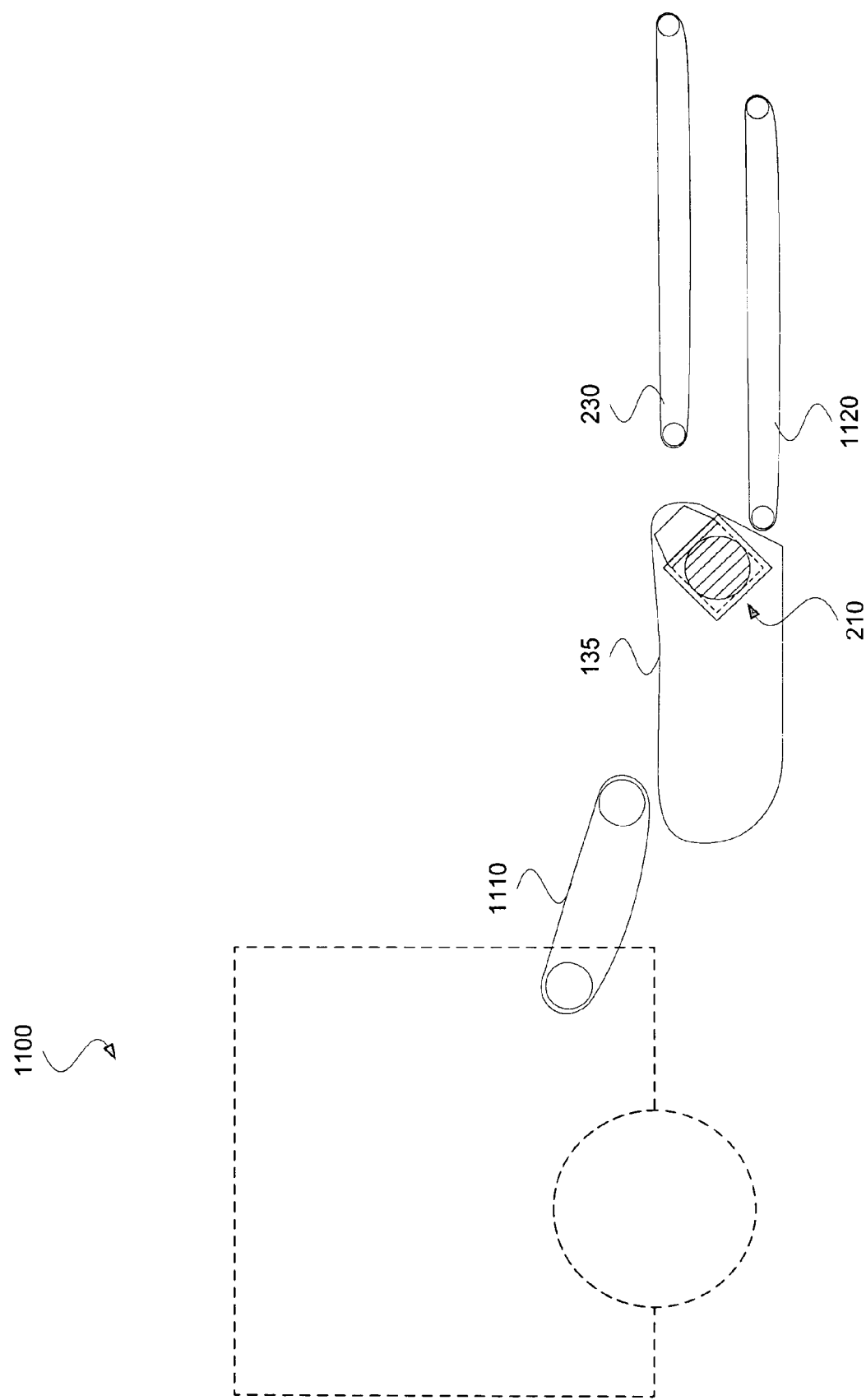
FIG. 12 is a side view illustrating a crop separating apparatus, according to one exemplary embodiment.

While the above-mentioned examples were described in the context of a crop separating harvester (100; FIG. 1) operating as a tractor implement being pulled by and receiving operational power and control from a tractor (150; FIG. 1), the present crop separating air chamber may be incorporated in to any number of configurations. FIG. 12 illustrates a crop separation apparatus incorporating the teachings of the present exemplary system and method, according to one exemplary embodiment. As illustrated in FIG. 12, a force air box (210) may be configured to introduce forced air at the apex of a primary chain (135) disposed in a crop packing or transloading station. According to one exemplary embodiment, crop and some culls may be unloaded from a truck (1100) onto a transitional conveyor belt (1110) which transports the crop to the primary chain (135). Once on the primary chain, the crop and its associated cull is transported to the apex of the primary chain (135) where forced air imparts a lift force thereon. As mentioned previously, the crop, having a lower specific gravity, will receive greater relative lift from the forced air and will bridge the crop separation gap onto the crop transfer conveyor (230). Cull, having a higher specific gravity, will not receive the same relative lift, and will pass through to a cull conveyor (1120) to be discarded. According to one exemplary embodiment, rotten or undesirable crop will often have a greater specific gravity than desirable crop and may be separated according to the teachings of the present exemplary system and method.

In conclusion, the present system and method for making and operating a crop separating harvester includes physically separating desirable crop from culls based on specific gravity. By imparting a lifting force on a mixture of culls and crop, the crop, having a lower specific gravity, may be levitated and mechanically separated from the undesirable cull. Additionally, to further separate the substantially separated crop from the cull, a compartmentalized separation table may be employed to aid in the rapid separation of cull from crop. Due to the rapid and effective crop separation, harvest time and costs may be greatly reduced.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A crop separating harvester comprising:
   a primary crop path having an apex;
   a forced air supply disposed at said apex, wherein said forced air supply is tangentially positioned relative to said apex from a bottom side of said crop path;
   a crop retrieval member wherein said crop retrieval member is separated from said apex a predetermined distance defining a gap configured to separate culls from a crop based on a difference in specific gravity between said crop and said culls with respect to said forced air; and
   a crop lifting assembly, wherein said crop lifting assembly includes a first chamber and a second chamber, said first chamber configured to contain crop and culls that pass between said gap, and said second chamber configured to receive crop from said crop retrieval member.

2. The crop separating harvester of claim 1, wherein said crop retrieval member comprises a belt configured to transport received crop to said second chamber.

3. The crop separating harvester of claim 2, wherein said crop retrieval member further comprises a retention roller disposed between said forced air supply and said belt;
   wherein said retention roller is configured to prevent crop from falling from said belt into said first chamber of said crop lifting assembly.

4. The crop separating harvester of claim 1, further comprising an inspection table associated with said crop lifting assembly;
   wherein said inspection table comprises at least a first and a second channel;
   wherein said first channel is configured to receive objects from said second chamber and pass them on to a crop loading member, and
   wherein said second channel is configured to receive objects from said first chamber for discard.

5. The crop separating harvester of claim 4, wherein said inspection table further comprises a third and a fourth channel disposed between said first and second channel;

wherein said third channel is adjacent to said first channel, said third channel being configured to receive identified cull in said first channel and discard said cull; and wherein said fourth channel is disposed between said third channel and said second channel, said fourth channel being configured to receive identified crop in said second channel and transport said identified crop to a crop loading member.

6. The crop separating harvester of claim 1, further comprising:
- a power takeoff input; and
- a forced air generator coupled to said power takeoff input;
- wherein said forced air generator is coupled to said forced air supply.

7. The crop separating harvester of claim 1, wherein:
- an angle of said forced air supply is selectively variable; and
- a velocity of said primary crop path is controllably variable.

8. A crop separating harvester comprising:
- a primary crop path including a digging mechanism and a primary transport mechanism;
- a forced air supply angularly positioned relative to said crop path from a bottom side of said crop path;
- a crop retrieval member separated from said forced air supply a predetermined distance defining a gap configured to separate culls from a crop based on a difference in specific gravity between said crop and said culls with respect to said forced air; and
- a crop lifting assembly;
- wherein said crop lifting assembly comprises a first chamber and a second chamber;
- said first chamber configured to contain crop and culls that pass between said gap; and
- said second chamber configured to receive crop from said crop retrieval member;
- wherein said crop retrieval member comprises a belt configured to transport received crop to said second chamber.

9. The crop separating harvester of claim 1, wherein said crop retrieval member further comprises a retention roller disposed between said forced air supply and said belt;
- wherein said retention roller is configured to prevent crop from falling from said belt into said first chamber of said crop lifting assembly.

10. The crop separating harvester of claim 1, further comprising an inspection table associated with said crop lifting assembly;
- wherein said inspection table comprises at least a first a second, a third, and a fourth channel;
- wherein said first channel is configured to receive objects from said second chamber and pass them on to a crop loading member;
- wherein said second channel is configured to receive objects from said first chamber for discard;
- wherein said third and a fourth channel are disposed between said first and second channel;
- wherein said third channel is adjacent to said first channel, said third channel being configured to receive identified cull in said first channel and discard said cull; and
- wherein said fourth channel is disposed between said third channel and said second channel, said fourth channel being configured to received identified crop in said second channel and transport said identified crop to a crop loading member.

* * * * *

UNITED STATES PATENT AND TRADEMARK OFFICE
CERTIFICATE OF CORRECTION

| | | |
|---|---|---|
| PATENT NO. | : 7,322,424 B2 | Page 1 of 1 |
| APPLICATION NO. | : 11/188350 | |
| DATED | : January 29, 2008 | |
| INVENTOR(S) | : Duane Robert Kido | |

It is certified that error appears in the above-identified patent and that said Letters Patent is hereby corrected as shown below:

Column 10, Line 6, Claim 9 change "The crop separating harvester of claim 1" to --The claim harvester of claim 8--

Column 10, Line 12, Claim 10 change "The crop separating harvester of claim 1" to --The crop separating harvester of claim 8--

Signed and Sealed this

Sixth Day of May, 2008

JON W. DUDAS
*Director of the United States Patent and Trademark Office*